United States Patent
Karasawa

[11] Patent Number: 6,052,814
[45] Date of Patent: *Apr. 18, 2000

[54] CODING/DECODING APPARATUS

[75] Inventor: Katsumi Karasawa, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/421,867

[22] Filed: Apr. 14, 1995

[30] Foreign Application Priority Data

Apr. 19, 1994 [JP] Japan ................................. 6-104859

[51] Int. Cl.$^7$ ................................................ H03M 13/00
[52] U.S. Cl. ......................... 714/755; 382/236; 382/250; 382/251; 348/403; 348/405
[58] Field of Search ................................. 371/37.1, 37.2, 371/37.4, 37.7, 41; 358/133, 135, 136, 138, 141, 11–13; 348/396, 391, 402, 405, 420; 369/124; 382/232–239, 250, 251

[56] References Cited

U.S. PATENT DOCUMENTS

| | | | |
|---|---|---|---|
| 5,122,875 | 6/1992 | Raychaudhuri et al. | 358/133 |
| 5,231,487 | 7/1993 | Hurley et al. | 358/133 |
| 5,247,579 | 9/1993 | Hardwick et al. | 371/40 |
| 5,377,051 | 12/1994 | Lane et al. | 360/33.1 |
| 5,436,917 | 7/1995 | Karasawa | 371/37.4 |
| 5,488,428 | 1/1996 | Ueda et al. | 358/339 |
| 5,506,621 | 4/1996 | Ogasawara et al. | 348/396 |
| 5,521,898 | 5/1996 | Ogasawara | 369/124 |

*Primary Examiner*—Emmanuel L. Moise
*Attorney, Agent, or Firm*—Fitzpatrick Cella Harper & Scinto

[57] ABSTRACT

According to the present invention, there is provided a coding apparatus including an input unit for inputting image data, a coding unit for coding the image data input by the input unit, and an error detection/correction coding unit for performing error detection coding or correction coding of the image data coded by the coding unit, the coding unit coding the image data by selectively using first and second coding modes based on different coding methods, and the error detection/correction coding unit performing different error correction and correction coding operations depending on the coding mode. In addition, there is provided a decoding apparatus for inputting coded data which is coded by selectively using first and second coding modes based on different coding methods and has undergone different error correction coding operations depending on the first and second coding modes, and coding mode data indicating a specific one of the first and second coding modes by which the coded data has been coded, and decoding the coded data, including a detection unit for detecting the coding mode data, and an error code correction unit for performing error code correction of the coded data in accordance with an output from the detection unit.

28 Claims, 3 Drawing Sheets

CODING/DECODING APPARATUS

BACKGROUND OF THE INVENTION

1. Field of the Invention

The present invention relates to a coding/decoding apparatus having a plurality of coding modes and used for an image signal.

2. Related Background Art

Various coding schemes have been proposed to reduce the transmission data quantity in performing digital transmission of image information.

According to one of the proposed coding schemes, coding is performed by switching intraframe coding (intra) and interframe coding (inter). Intraframe compression is a scheme of reducing the information quantity by utilizing the characteristic of an image that adjacent pixels are similar in brightness and color. In compressing an actual image, since most parts of the image, e.g., sky and wall portions, are almost similar in brightness and color, the data quantity can be reduced to about 1/5 to 1/10 by using only the intraframe compression scheme.

Interframe compression is a scheme of obtaining an image from only information of a correction portion by using similar images.

In general, adjacent frames of a motion image similar in graphic pattern although there is a slight motion or change. Using this point, similarities (motion, color, brightness, and the like) between a frame to be compressed/coded and an adjacent frame are calculated. Values for a frame similar to the "frame to be coded" are calculated from "prediction values", i.e., the "adjacent frame" on the basis of the calculations.

Subsequently, only difference information between the "prediction values" and the corresponding values of the frame to be coded is coded (recorded/transmitted). For this reason, the data quantity (correction portion) is reduced.

Assume that a motion image includes only a human figure, and the human figure moves to the right. In this case, pixels corresponding to the human figure in a preceding frame, including correction information of movement, are prediction values, and differences are obtained by subtracting the prediction values from the values of all the pixels which have moved to the right.

It is known that in general, in a conventional coding apparatus, when an error occurs on a transmission line in performing compression by inter-coding, the error propagates. Therefore, intra-coding is automatically performed every time inter-coding is performed a predetermined number of times.

As described above, in the above conventional coding apparatus, when inter-coding is continued, the above refresh operation is performed at predetermined time intervals to prevent continuous propagation of an error caused in the process of transmission. If, however, an error occurs in intra-coded information, propagation of the error cannot be prevented during a period before intra-coding or a refresh operation is performed.

SUMMARY OF THE INVENTION

The present invention has been made in consideration of the above situation, and has as its object to provide a coding/decoding apparatus which can efficiently prevent propagation of an error caused in the process of transmitting coded data.

In order to achieve the above object, according to an aspect of the present invention, there is provided a coding apparatus comprising input means for inputting image data, coding means for coding the image data input by the input means, and error detection/correction coding means for performing error detection coding/correction coding for the image data coded by the coding means, wherein the coding means codes the image data by selectively using first and second coding modes based on different coding methods, and the error detection/correction coding means performs different error detection or correction coding operations depending on the coding mode.

In addition, according to another aspect of the present invention, there is provided a decoding apparatus for inputting coded data which is coded by selectively using first and second coding modes based on different coding methods and has undergone different error correction coding operations depending on the first and second coding modes, and coding mode data indicating a specific one of the first and second coding modes by which the coded data has been coded, and decoding the coded data, comprising detection means for detecting the coding mode data, and error code correction means for performing error code correction of the coded data in accordance with an output from the detection means.

Other objects, features and advantages of the invention will become apparent from the following detailed description taken in conjunction with the accompanying drawings.

DETAILED DESCRIPTION OF THE PREFERRED EMBODIMENT

An embodiment of the present invention will be described below with reference to the accompanying drawings.

Figure 1:
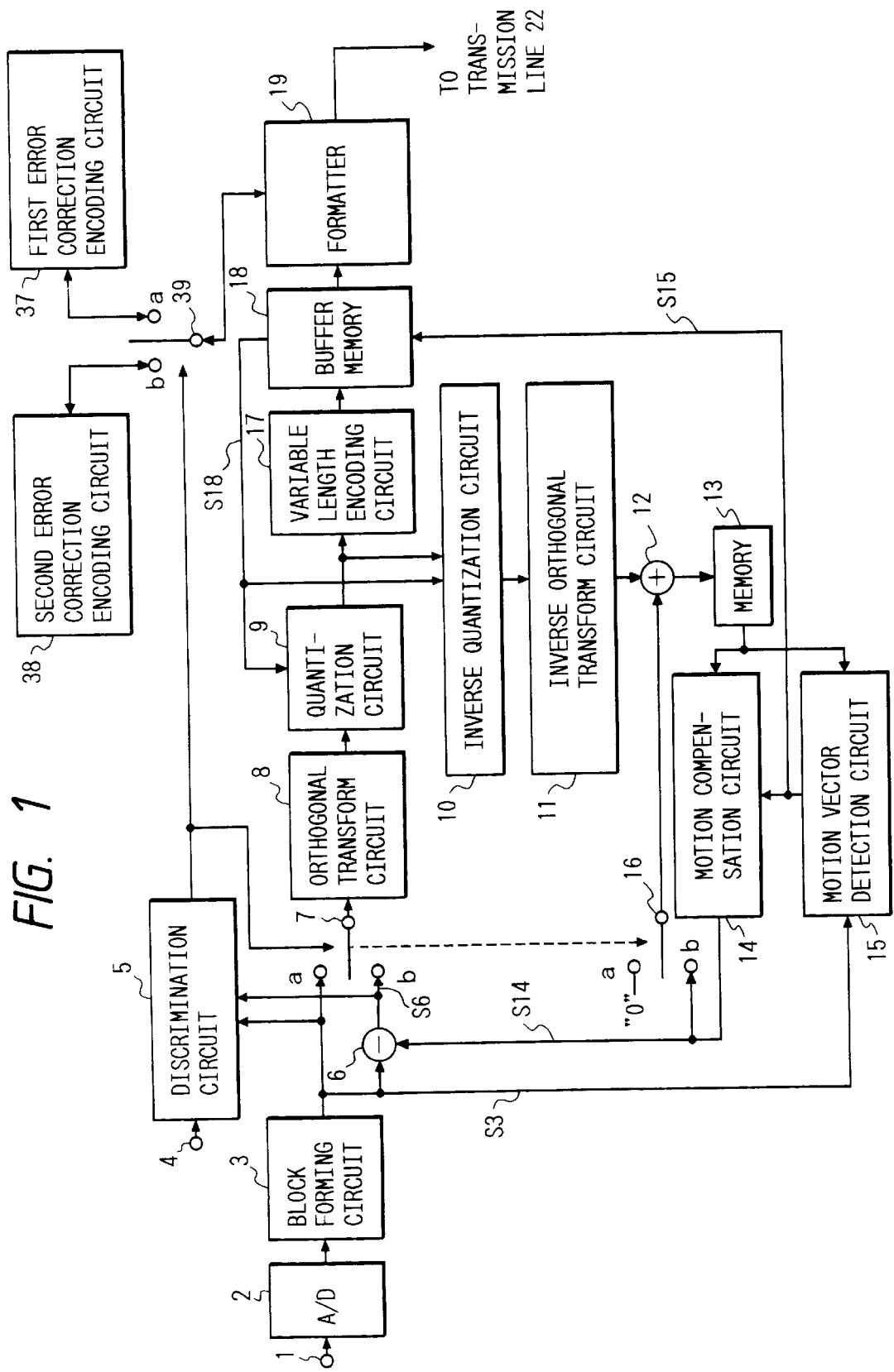
FIG. 1 is a block diagram showing the arrangement of a coding apparatus according to an embodiment of the present invention.

FIG. 1 is a block diagram showing the arrangement of a coding apparatus according to an embodiment of the present invention.

Referring to FIG. 1, an analog image signal input through an input terminal 1 is converted into a digital signal by an A/D (analog/digital) conversion circuit 2.

The image signal converted into the digital signal by the A/D conversion circuit 2 is divided into blocks each consisting of m pixels (in the horizontal direction)×n lines (in the vertical direction, for example, m=n=8), and the luminance and chrominance signals are converted into coding unit block (to be referred to as a macro block hereinafter) data S3 consisting of, e.g., data of 16×16 pixels.

The macro block data S3 is supplied to a discrimination circuit 5, a prediction error calculation circuit 6, a terminal a of a switch 7, and a motion vector detection circuit 15.

The discrimination circuit 5 is a circuit for determining, by a method to be described later, whether to execute intraframe coding (to be referred to as intra hereinafter) or interframe coding (to be referred to as inter hereinafter).

The prediction error calculation circuit 6 calculates difference data S6 based on a difference between the macro block data S3 and prediction data S14 generated by a motion compensation circuit 14. The difference data S6 is supplied to the discrimination circuit 5 and a terminal b of the switch 7.

The discrimination circuit 5 compares the input macro block data S3 and difference data S6 with each other to discriminate which data has a higher coding efficiency. Switching control of the switch 7 and switches 16 and 39 is performed.

If the discrimination circuit 5 discriminates that the macro block data S3 of the current frame has a higher coding efficiency, terminals a of the switches 7, 16, and 39 are adaptively selected. If the discrimination circuit 5 discriminates that the difference data S6 has a higher coding efficiency, terminals b of the switches 7, 16, and 39 are adaptively selected.

A frame signal as a timing signal for a refresh operation is input from a frame signal input terminal 4 to the discrimination circuit 5.

In continuing transmission of inter-coded data, if the degree of an error caused in a data transmission operation exceeds the error correction ability of the apparatus, the error keeps propagating. For this reason, this refresh operation is performed to forcibly transmit intra-coded data at predetermined time intervals to prevent continuous propagation of the error.

Referring back to FIG. 1, a signal selected by the switch 7 is input to an orthogonal transform circuit 8. The orthogonal transform circuit 8 performs orthogonal transform of the input signal by, e.g., DCT (discrete cosine transform), and inputs the transformed coefficient to a quantization circuit 9. The quantization circuit 9 quantizes the orthogonal-transformed coefficient. The quantization step for this operation is controlled by control data S18 from a buffer memory 18.

The data quantized by the quantization circuit 9 is supplied to an inverse quantization circuit 10 and a variable length encoding circuit 17.

The variable length encoding circuit 17 performs variable-length coding of the quantized data output from the quantization circuit 9 in accordance with the frequency of occurrence of the data, and supplies the variable-length-coded data to the buffer memory 18.

The buffer memory 18 temporarily stores various parameters (e.g., quantization step information) for coding, in addition to the variable-length-coded data and motion vector S15 from the motion vector detection circuit 15. Furthermore, the remaining data quantity (the data occupation ratio of the buffer memory) of the buffer memory 18 is sequentially detected, and the control data S18 which changes in accordance with this remaining data quantity is fed back to the quantization circuit 9 and the inverse quantization circuit 10.

The quantization steps of the quantization circuit 9 and the inverse quantization circuit 10 are controlled on the basis of the control data S18. That is, the buffer memory 18 incorporates a control means for generating control data for controlling the quantization steps of the quantization circuit 9 and the inverse quantization circuit 10.

With this control, data is supplied to a formatter 19 while the quantity of data held in the buffer memory 18 is properly maintained.

Meanwhile, the signal input to the inverse quantization circuit 10 is inversely quantized by characteristics inverse to those of the quantization circuit 9 and output as a signal identical to an input signal to the quantization circuit 9.

Similarly, a signal input to an inverse orthogonal transform circuit 11 is subjected to inverse orthogonal transform in accordance with characteristics inverse to those of the orthogonal transform circuit 8 and output as a signal identical to an input signal to the orthogonal transform circuit 8.

In the inverse orthogonal transform circuit 11, the orthogonal-transformed signal is input to an addition circuit 12 to be added to a signal selected by the switch 16.

In the intra-mode, the macro block data S3 of the current frame is input from the switch 7 to the addition circuit 12 via the terminal a after the data S3 undergoes the above orthogonal transform, quantization, inverse quantization, and inverse orthogonal transform. In the switch 16, since the terminal a for a silence signal is selected, a signal value input from the switch 16 to the addition circuit 12 is "0". Therefore, an output signal from the addition circuit 12 is identical to the macro block data S3 output from the block forming circuit 3.

In the inter-mode, both the switches 7 and 16 are connected to the terminals b, and the difference data S6 is input from the switch 7 to the addition circuit 12 after the data S6 undergoes the above orthogonal transform, quantization, inverse quantization, and inverse orthogonal transform. The output data from the motion compensation circuit 14, i.e., the prediction data S14, which is read out from the memory 13, is input from the terminal b of the switch 16 to the addition circuit 12. Therefore, an output signal from the addition circuit 12 becomes identical to the macro block data S3 output from the block forming circuit 3 as in the intra-mode.

In this manner, in either of the modes described above, data equivalent to the macro block data S3 of the current frame is stored in the memory 13, and the stored data is read out with a delay corresponding to one frame and supplied to the motion compensation circuit 14 and the motion vector detection circuit 15.

The motion vector detection circuit 15 compares the macro block data S3, i.e., the image data of the current frame, with the image data of the preceding frame stored in the memory 13, and converts the motion of the block to be coded into the motion vector S15. The motion vector detection circuit 15 then supplies the motion vector S15 to the motion compensation circuit 14.

The motion compensation circuit 14 performs motion compensation for the image data of the preceding frame and supplies the resultant data as the prediction data S14 to the prediction error calculation circuit 6 and the terminal b of the switch 16.

In the formatter 19, a sync signal for transmission synchronization and the like are added to the data input from the buffer memory 18, and error correction of the coded data output from the buffer memory 18 is performed by first and second error correction encoding circuits 37 and 38 in accordance with a selected terminal of the switch 39.

Note that the first and second error correction encoding circuits 37 and 38 perform error correction coding by using a double RS (Reed-Solomon) code.

The data error-corrected coded by the first or second error correction encoding circuit 37 or 38 is output to a transmission line 22 in accordance with a transmission rate.

Figure 3A:
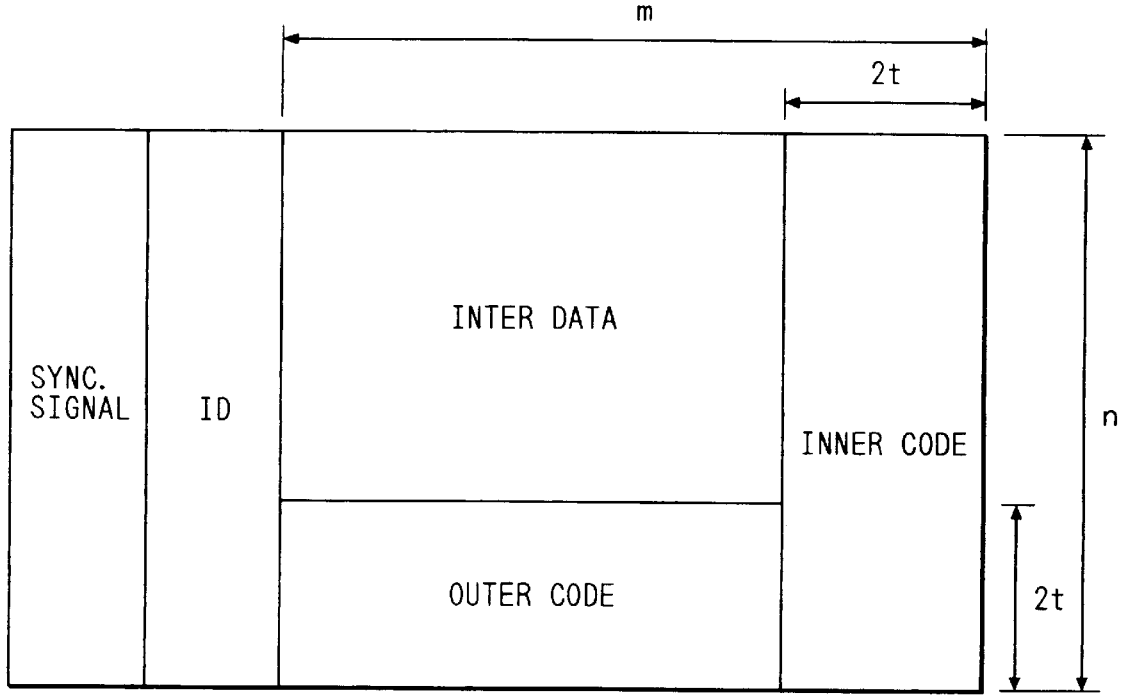
FIGS. 3A and 3B are views for explaining error correction coding blocks in two coding modes (intra/inter) in the embodiments of the present invention.
Figure 3B:
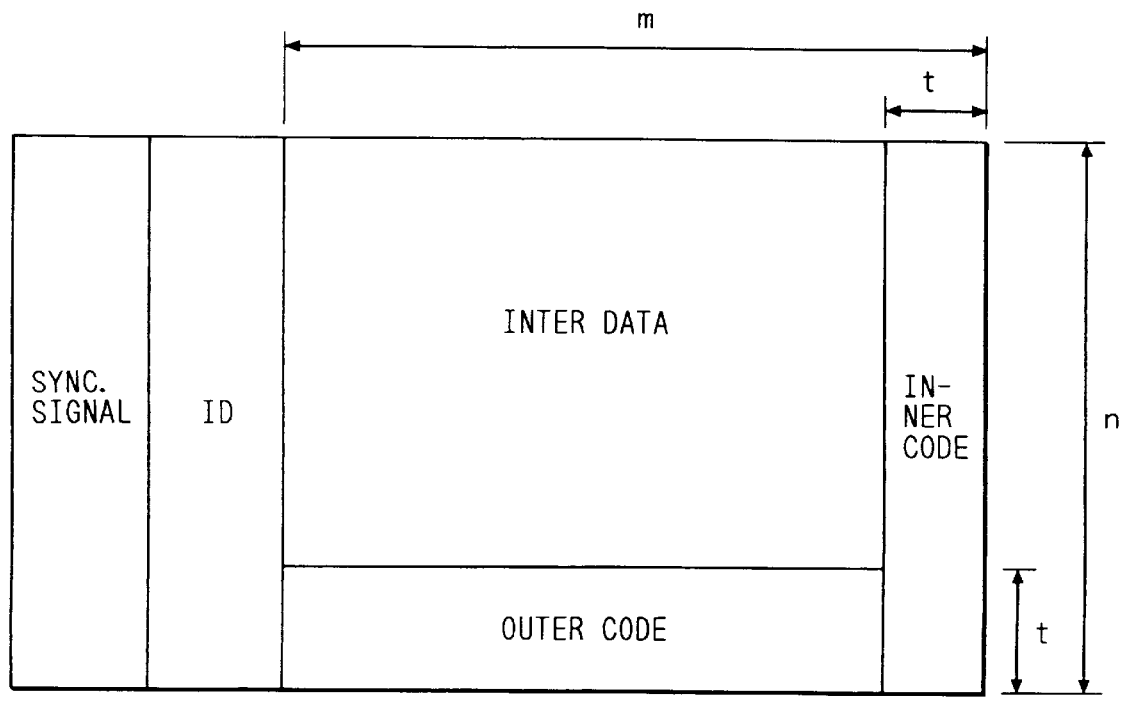

FIGS. 3A and 3B are views for explaining error correction coding blocks in the two coding modes (intra/inter) described above.

As shown in FIG. 3A, in the intra-mode, error correction coding is performed by the first error correction encoding circuit 37 using an inner code (m, m−2t) RS and an outer code (n, n−2t) RS.

As shown in FIG. 3B, in the inter-mode, error correction coding is performed by the second error correction encoding circuit 38 using an inner code (m, m−t) RS and outer code (n, n−t) RS.

An intra/inter identification signal for discriminating the two coding modes, a coding parameter (e.g., quantization step information), and the like are added to the ID area shown in FIGS. 3A and 3B, and the resultant data is output to the transmission line 22 in accordance with the transmission rate.

Figure 2:
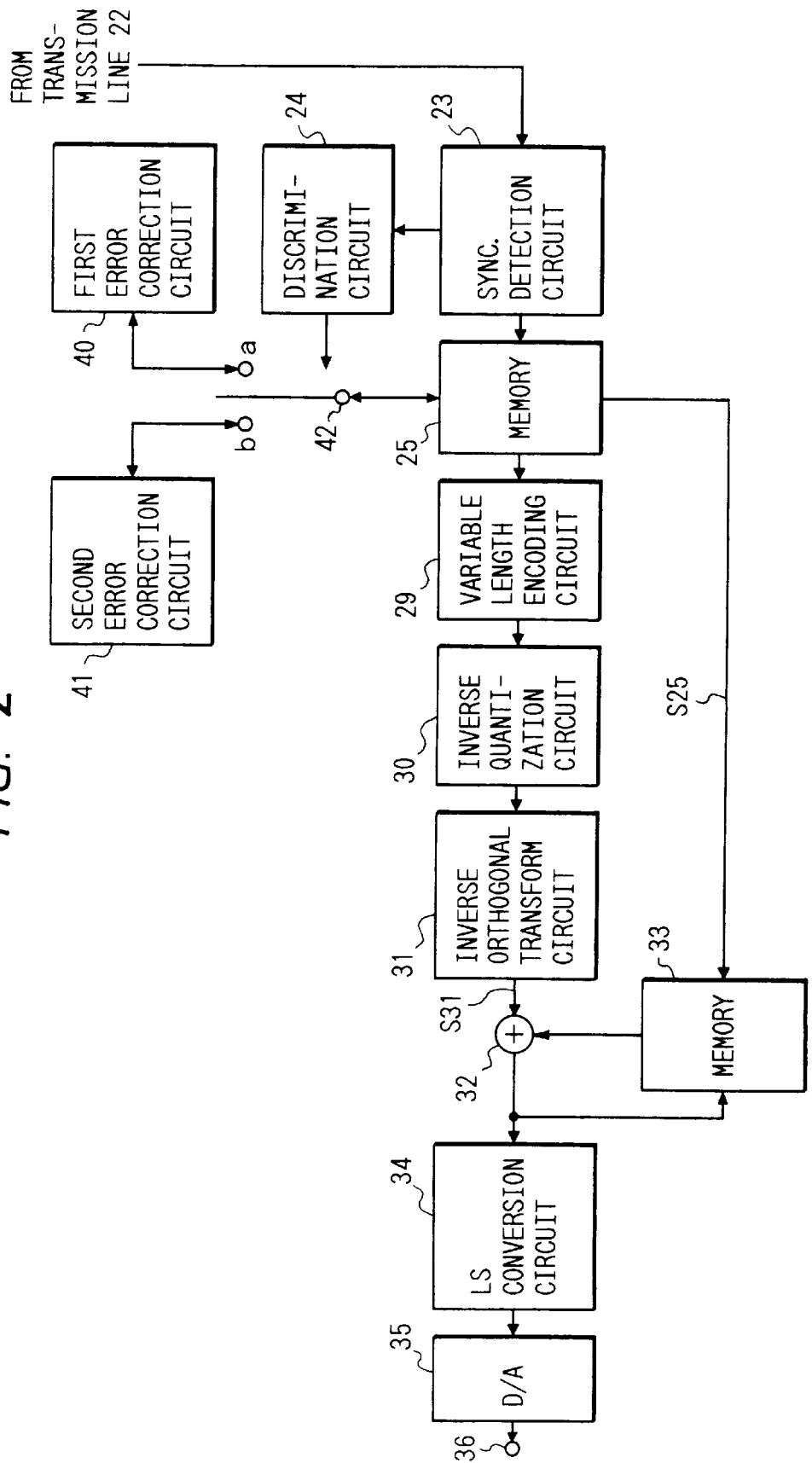
FIG. 2 is a block diagram showing the arrangement of a decoding apparatus according to the embodiment of the present invention.

FIG. 2 is a block diagram showing the arrangement of a decoding apparatus according to the embodiment of the present invention.

Referring to FIG. 2, image data transmitted via the transmission line 22 is stored in a memory 25 after transmission synchronization is established by the sync detection circuit 23.

The information of the ID area shown in FIGS. 3A and 3B is supplied to the discrimination circuit 24 in synchronous detection, and a coding mode is determined on the basis of the intra/inter identification signal in the information.

When the intra-mode is detected by the discrimination circuit 24, a terminal a is selected in a switch 42. In this case, when an error occurs in the process of transmitting the data stored in the memory 25, t-fold error correction for the inner code (m, m−2t) RS and the outer code (n, n−2t) RS is performed by a first error correction circuit 40.

When the inter-mode is detected, a terminal b is selected in the switch 42, and t/2-fold error correction for the inner code (m, m−t) RS and an outer code (n, n−t) RS is performed by a second error correction circuit 41.

The above variable-length-coded data or a motion vector S25 is identified by the data in the memory 25, which is error-corrected in this manner. The identified variable-length-coded data is supplied to a variable length encoding circuit 29, and the identified motion vector S25 is supplied to a memory 33. The data variable-length-decoded by the variable length encoding circuit 29 is inversely quantized by an inverse quantization circuit 30. The resultant data is subjected to inverse orthogonal transform in an inverse orthogonal transform circuit 31. As a result, the data is decoded into difference data S31 having the same contents as those of the difference data S6 output from the prediction error calculation circuit 6 in FIG. 1.

Meanwhile, the memory 33 generates prediction data equivalent to the prediction data S14 output from the motion compensation circuit 14 in FIG. 1 on the basis of the supplied motion vector S25, and outputs the prediction data to an addition circuit 32.

The addition circuit 32 adds the prediction data and the difference data S31 to generate macro block data, and outputs the generated macro block data to the memory 33 and an LS (line scan) conversion circuit 34.

The image data in the memory 33 is sequentially corrected and updated in accordance with the macro block data. In the LS conversion circuit 34, the image data input from the addition circuit 32 is converted into a digital signal having a line scan structure. The digital signal is then converted into an analog image signal by a D/A conversion circuit 35 and output from an output terminal 36.

As has been described above, according to the coding/decoding apparatus of this embodiment, in the intra-mode, error correction coding is performed by the first error correction encoding circuit 37 using the inner code (m, m−2) RS and the outer code (n, n−2t) RS, and t-fold error correction of the inner code (m, m−2t) RS and the outer code (n, n−2t) RS is performed by the first error correction circuit 40. In the inter-mode, error correction is performed by the second error correction encoding circuit 38 using the inner code (m, m−t) RS and the outer code (n, n−t) RS, and t/2-fold error correction of the inner code (m, m−t) RS and the outer code (n, n−t) RS is performed by the second error correction circuit 41, thereby enhancing the error correction ability in the intra-mode. Therefore, propagation of an error caused on a transmission line can be efficiently prevented.

Various changes and modifications of the embodiment described above can be made without departing the spirit and scope of the invention.

The embodiment exemplifies the case wherein double RS codes are used. However, the present invention is not limited to this. For example, RS codes, convolution codes, or the like may be used.

In addition, the correction ability is not limited to the form described above. The correction ability may be ensured in any form as long as error protection for information coded by the intra-mode is enhanced as compared with error protection for information coded by the inter-mode. For example, RS codes may be used for coding by the inter-mode, while convolution codes may be used for coding in the intra-mode. Alternatively, RS codes may be used for coding by the inter-mode, while convolution codes+RS codes may be used for coding in the intra-mode.

Furthermore, the embodiment can also be applied to an error detection coding/decoding operation in which only error detection is performed but no correction is performed. In this case, the error correction ability in the intra-mode may be enhanced more than that in the inter-mode.

Moreover, in the embodiments, intraframe coding and interframe coding are used as the coding modes. However, the embodiment can also be applied to intrafield coding and interfield coding.

In other words, the foregoing description of embodiment has been given for illustration purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A coding apparatus comprising:

input means for inputting an image signal;

coding means for coding the image signal input by said input means, said coding means having at least first and second coding modes, wherein in the first coding mode intra-picture coding is performed and wherein in the second coding mode inter-picture coding is performed; and error detection/correction coding means for performing error detection/correction coding for the image signal coded by said coding means, said error detection/correction coding means performing error detection/correction coding having a different error correction ability depending on the coding mode, wherein an error correction ability in the first coding mode is higher than an error correction ability in the second coding mode.

2. An apparatus according to claim 1, wherein said coding means performs coding by using a discrete cosine transform (DCT).

3. An apparatus according to claim 1, further comprising a buffer memory for temporarily storing the coded data to be read out at a predetermined transmission rate.

4. An apparatus according to claim 1, wherein said coding means includes quantization means for quantizing the image signal input by said input means.

5. An apparatus according to claim 4, further comprising control means for controlling a quantization step of said quantization means in accordance with a remaining data quantity of said buffer memory.

6. An apparatus according to claim 1, further comprising output means for outputting coding mode data indicating a coding mode executed by said coding means upon synthesizing the data with coded data output from said error detection/correction coding means.

7. A coding apparatus comprising:
a) block forming means for forming a block of sample values of an input signal;
b) coding means having at least first and second coding modes, wherein in the first coding mode the block of the input signal is coded by using data representative of differences between prediction values and the sample values of the block, and wherein in the second coding mode the block of the input signal is coded without using the data representative of differences; and
c) error detection/correction coding means for performing error detection coding or correction coding for the input signal coded by said coding means,
wherein said error detection/correction coding means performs error detection or correction coding having a different error correction ability depending on the coding mode.

8. An apparatus according to claim 7, further comprising
a) comparing means for comparing a data quantity of the data representative of differences with a data quantity of data representing the sample values; and
b) changing means for changing between the coding modes in accordance with a comparison result of said comparing means.

9. An apparatus according to claim 7, further comprising a buffer memory for temporarily storing the coded data to be read out at a predetermined transmission rate.

10. An apparatus according to claim 7, wherein said coding means includes quantization means for quantizing the image signal input by said input means.

11. An apparatus according to claim 10, further comprising
control means for controlling a quantization step of said quantization means in accordance with a remaining data quantity of said buffer memory.

12. An apparatus according to claim 7, further comprising
output means for outputting coding mode data indicating a coding mode executed by said coding means upon synthesizing the data with coded data output from said error detection/correction coding means.

13. A coding apparatus comprising:
block forming means for forming blocks of sample values of an input signal;
coding means having at least first and second coding modes, wherein in the first coding mode the blocks formed by said block forming means are prediction-coded, and wherein in the second coding mode the blocks formed by said block coding means are coded without prediction; and
error detection/correction coding means for performing error detection/correction coding for the input signal coded by said coding means,
wherein said error detection/correction coding means performs error detection/correction coding having a different error correction ability depending on the coding mode, and
wherein an error correction ability in the second coding mode is higher than an error correction ability in the first coding mode.

14. An apparatus according to claim 13, wherein said coding means includes orthogonal transformation means for orthogonal-transforming the blocks and quantization means for quantizing the blocks transformed by said orthogonal transformation means.

15. An apparatus according to claim 13, further comprising
output means for outputting coding mode data indicating a coding mode executed by said coding means upon synthesizing the data with coded data output from said error detection/correction coding means.

16. An apparatus according to claim 13, further comprising
a buffer memory for temporarily storing the coded data to be read out at a predetermined transmission rate.

17. An apparatus according to claim 13, wherein said coding means includes quantization means for quantizing the data blocks.

18. An apparatus according to claim 17, further comprising
control means for controlling a quantization step of said quantization means in accordance with a remaining data quantity of said buffer memory.

19. A decoding apparatus comprising:
inputting means for inputting coded data which was coded by using first and second coding modes respectively based on different coding methods and which has undergone error detection/correction coding having a different error correction ability depending on which of the first and second coding modes was used to generate the coded data, the first coding mode for performing intra-picture coding and the second coding mode for performing inter-picture coding, wherein an error correction ability in the first coding mode is higher than an error correction ability in the second coding mode;
detection means for detecting which coding mode the coded data input by said inputting means was coded with; and
error code correction means for performing error code correction of the coded data in accordance with an output of said detection means.

20. An apparatus according to claim 19, further comprising
decoding means for decoding the coded data corrected by said error code correction means.

21. An apparatus according to claim 19, wherein the coded data is coded by using a discrete cosine transform (DCT).

22. A coding method comprising:
an input step of inputting an image signal;
a coding step of coding the image signal input in said input step, said coding step having at least first and second coding modes, wherein in the first coding mode intra-picture coding is performed and wherein in the second coding mode inter-picture coding is performed; and
an error detection/correction coding step of performing error detection/correction coding for the image signal coded in said coding step, said error detection/correction coding step performing error detection/correction coding having a different error correction ability depending on the coding mode, wherein an error correction ability in the first coding mode is higher than an error correction ability in the second coding mode.

23. A decoding apparatus for decoding an image signal which was coded by a coding method defined in claim 22.

24. A decoding method for decoding an image signal which was coded by a coding method defined in claim 22.

25. A decoding method comprising:

an inputting step of inputting coded data which was coded by using first and second coding modes respectively based on different coding methods and which has undergone error detection/correction coding having a different error correction ability depending on which of the first and second modes was used to generate the coded data, the first coding mode for performing intra-picture coding and the second coding mode for performing inter-picture coding, wherein an error correction ability in the first coding mode is higher than an error correction ability in the second code mode;

a detection step of detecting which coding mode the coded data input in said inputting step was coded with; and an error code correction step of performing error code correction of the coded data in accordance with an output in said detection step.

26. A coding method comprising:

a block forming step of forming a block of sample valued of an input signal;

a coding step of coding the block, said coding step having at least first and second coding modes, wherein in the first coding mode the block is coded by using data representative of differences between prediction values and the sample values of the block, and wherein in the second coding mode the block is coded without using the data representative of the differences; and an error detection/correction coding step of performing error detection coding or correction coding for the block coded in said coding step, said error detection/correction coding step performing error detection coding or correction coding having a different error correction ability depending on the coding mode.

27. A decoding apparatus for decoding a block which was coded by a coding method defined in claim 26.

28. A decoding method for decoding a block which was coded by a coding method defined in claim 26.

* * * * *

UNITED STATES PATENT AND TRADEMARK OFFICE
CERTIFICATE OF CORRECTION

PATENT NO. : 6,052,814
DATED : April 18, 2000
INVENTOR(S) : KATSUMI KARASAWA

It is certified that error appears in the above-indentified patent and that said Letters Patent is hereby corrected as shown below:

ON THE TITLE PAGE:

[56] References Cited,

Under FOREIGN PATENT DOCUMENTS

"5,488,428" should read --5,488,482--; and

Under *Attorney, Agent, or Firm*

"Fitzpatrick Cella Harper & Scinto" should read --Fitzpatrick, Cella, Harper & Scinto--.

COLUMN 1:

Line 26, "image" should read --image are--.

COLUMN 2:

Line 63, "to" should read --to as--; and
Line 64, "to" should read --to as--.

COLUMN 4:

Line 51, "are" should read --is--.

UNITED STATES PATENT AND TRADEMARK OFFICE
CERTIFICATE OF CORRECTION

PATENT NO. : 6,052,814
DATED : April 18, 2000
INVENTOR(S) : KATSUMI KARASAWA

It is certified that error appears in the above-indentified patent and that said Letters Patent is hereby corrected as shown below:

COLUMN 6:

Line 13, "the" should read --from the--;
    Line 39, "not" should read --is not--; and
    Line 42, "not" should read --is not--.

COLUMN 10:

Line 5, "valued" should read --values--.

Signed and Sealed this

Tenth Day of April, 2001

Attest:

NICHOLAS P. GODICI

Attesting Officer     Acting Director of the United States Patent and Trademark Office